United States Patent
Cui et al.

(10) Patent No.: US 7,904,732 B2
(45) Date of Patent: Mar. 8, 2011

(54) ENCRYPTING AND DECRYPTING DATABASE RECORDS

(75) Inventors: Jing Cui, Highlands Ranch, CO (US); Jianhua Zhou, Parker, CO (US)

(73) Assignee: Rocket Software, Inc., Newton, MA (US)

(*) Notice: Subject to any disclaimer, the term of this patent is extended or adjusted under 35 U.S.C. 154(b) by 958 days.

(21) Appl. No.: 11/535,978

(22) Filed: Sep. 27, 2006

(65) Prior Publication Data

US 2008/0077806 A1 Mar. 27, 2008

(51) Int. Cl.
*G06F 11/30* (2006.01)
*G06F 12/14* (2006.01)
*G06F 7/00* (2006.01)
*H04L 29/06* (2006.01)

(52) U.S. Cl. ......... 713/193; 713/189; 713/164; 713/166; 726/26; 707/694

(58) Field of Classification Search .................. 713/189, 713/193, 164, 165, 166, 167; 726/21, 26, 726/27, 30; 380/44, 264, 277, 284, 281, 380/45; 707/1, 9, 687, 694
See application file for complete search history.

(56) References Cited

U.S. PATENT DOCUMENTS

| | | | |
|---|---|---|---|
| 6,321,201 B1* | 11/2001 | Dahl | 705/51 |
| 6,446,092 B1* | 9/2002 | Sutter | 707/203 |
| 6,591,272 B1 | 7/2003 | Williams | |
| 6,757,898 B1 | 6/2004 | Ilsen et al. | |
| 6,928,487 B2 | 8/2005 | Eggebraaten et al. | |
| 7,080,392 B1* | 7/2006 | Geshwind | 725/34 |
| 7,093,137 B1* | 8/2006 | Sato et al. | 713/193 |
| 7,111,005 B1* | 9/2006 | Wessman | 707/9 |
| 7,761,704 B2* | 7/2010 | Ho et al. | 713/158 |
| 2002/0016922 A1* | 2/2002 | Richards et al. | 713/200 |
| 2003/0021417 A1* | 1/2003 | Vasic et al. | 380/277 |
| 2003/0046572 A1* | 3/2003 | Newman et al. | 713/193 |
| 2003/0088783 A1* | 5/2003 | DiPierro | 713/189 |
| 2003/0123671 A1* | 7/2003 | He et al. | 380/282 |
| 2004/0030889 A1 | 2/2004 | Chin et al. | |

(Continued)

FOREIGN PATENT DOCUMENTS

JP 2002055931 2/2002

(Continued)

OTHER PUBLICATIONS

PCT Invitation to Pay Additional Fees and Partial Search Report, Dec. 11, 2007, for International Application No. PCT/EP2007/059711, 5 pp. Dmitriev, M., "Safe Class and Data Evolution in Large and Long-Lived Java Applications", SMLI TR-2001-98, Aug. 2001, 212 pp.

Jeloka, S., G. Mulagund, N. Lewis, J. Narasinghanallur, S. Tata, N. Manappa, R. Smith, D. Gosselin, and D.M. Wong, "Oracle Database-Security Guide", 10g Release 2 (10.2), B14266-01, Jun. 2005, 348 pp.

(Continued)

*Primary Examiner* — Matthew B Smithers
*Assistant Examiner* — Hilary Branske
(74) *Attorney, Agent, or Firm* — David W. Victor; Konrad Raynes & Victor LLP

(57) ABSTRACT

Provided are a method, system, and article of manufacture for encrypting and decrypting database records. Encryption metadata is provided for a database file having fields, wherein the encryption metadata indicates at least one encryption key for the file. A request is received to perform a read or write operation with respect to a record including the fields for the database file. A determination is made from the encryption metadata of the at least one encryption key for the database file. The determined encryption key is used to encrypt or decrypt for the read or write operation with respect to at least one of the fields in the database file.

36 Claims, 8 Drawing Sheets

U.S. PATENT DOCUMENTS

| | | | |
|---|---|---|---|
| 2004/0181679 A1* | 9/2004 | Dettinger et al. | 713/193 |
| 2006/0053112 A1* | 3/2006 | Chitkara et al. | 707/9 |
| 2006/0095791 A1* | 5/2006 | Wong | 713/189 |
| 2006/0206485 A1* | 9/2006 | Rubin et al. | 707/9 |
| 2006/0277413 A1* | 12/2006 | Drews | 713/189 |
| 2006/0288232 A1* | 12/2006 | Ho et al. | 713/185 |

FOREIGN PATENT DOCUMENTS

| | | |
|---|---|---|
| WO | 2006006931 | 1/2006 |

OTHER PUBLICATIONS

Oracle, "Using Transparent Database Encryption", [online], [retrieved on Aug. 28, 2006], retrieved from the Internet at <URL: http://www.oracle.com/technology/obe/10gr2_db_vmware/security/tde/tde.htm?_template>, 11 pp.

Templeton, M., H. Henley, E. Maros, and D.J. Van Buer, "InterVisio: Dealing With the Complexity of Federated Database Access", VLDB Journal, 1995, pp. 287-317.

* cited by examiner

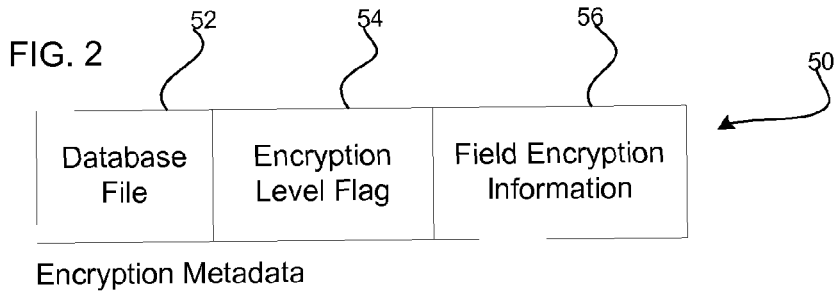
FIG. 2 Encryption Metadata
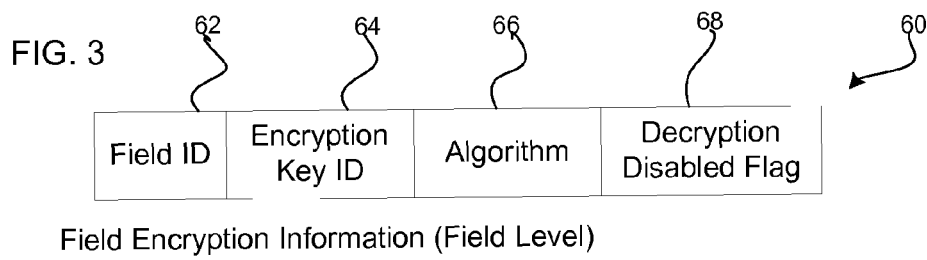
FIG. 3 Field Encryption Information (Field Level)
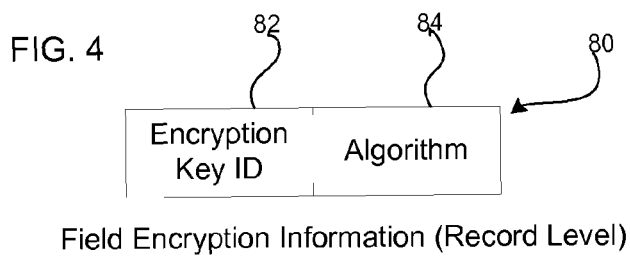
FIG. 4 Field Encryption Information (Record Level)
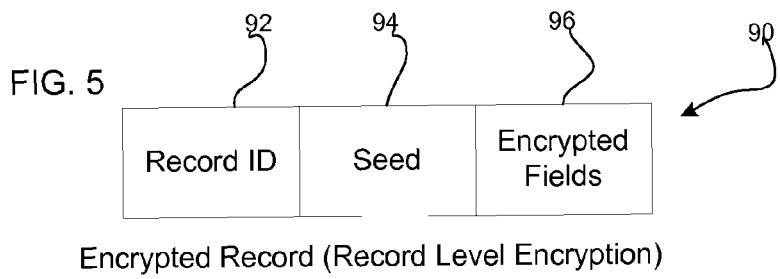
FIG. 5 Encrypted Record (Record Level Encryption)
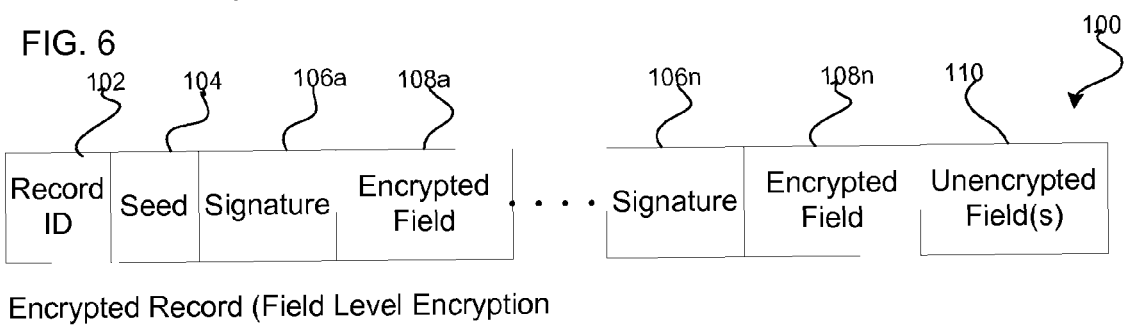
FIG. 6 Encrypted Record (Field Level Encryption)

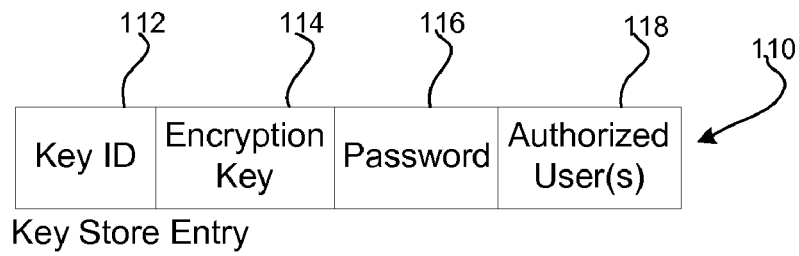
FIG. 7
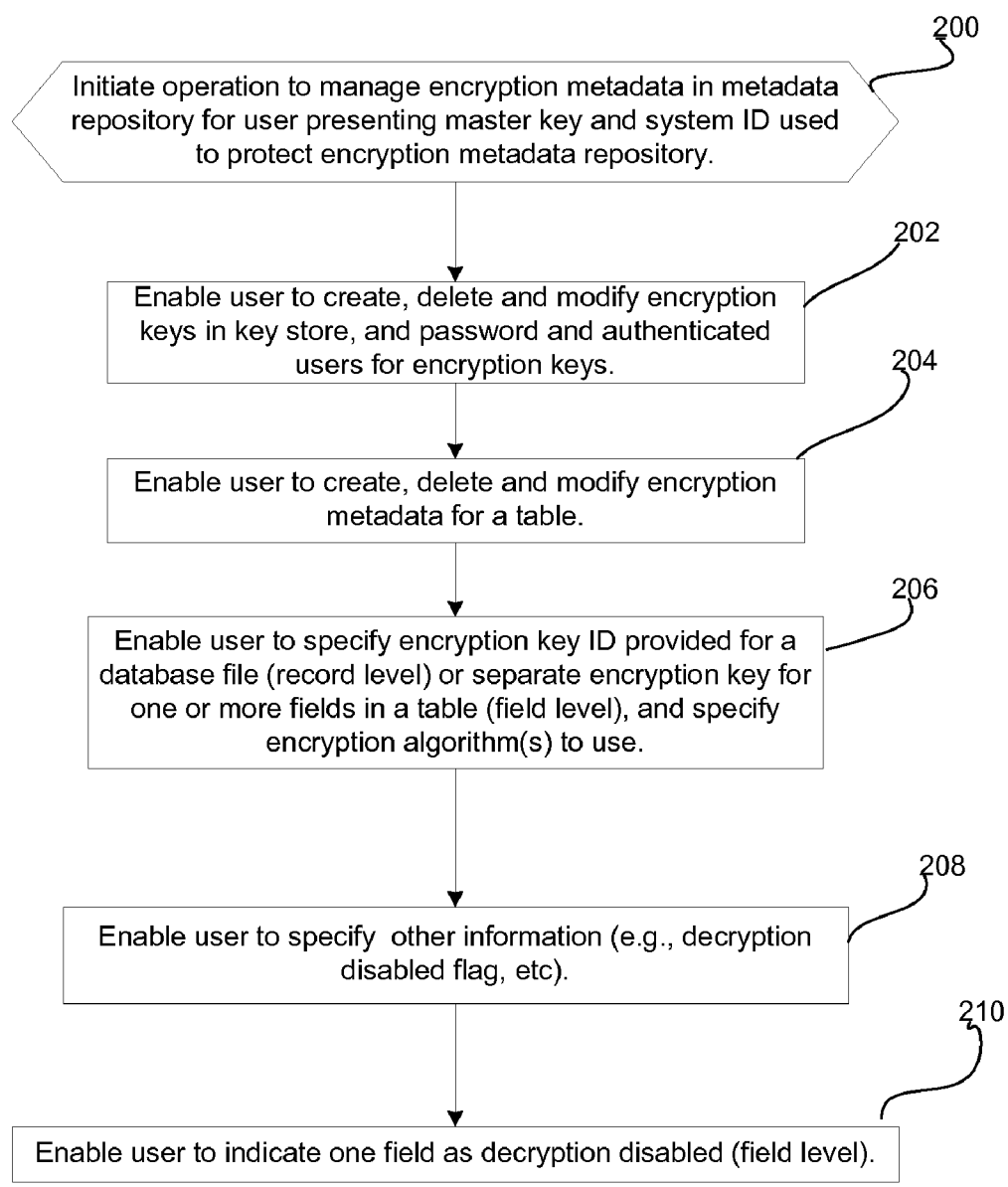

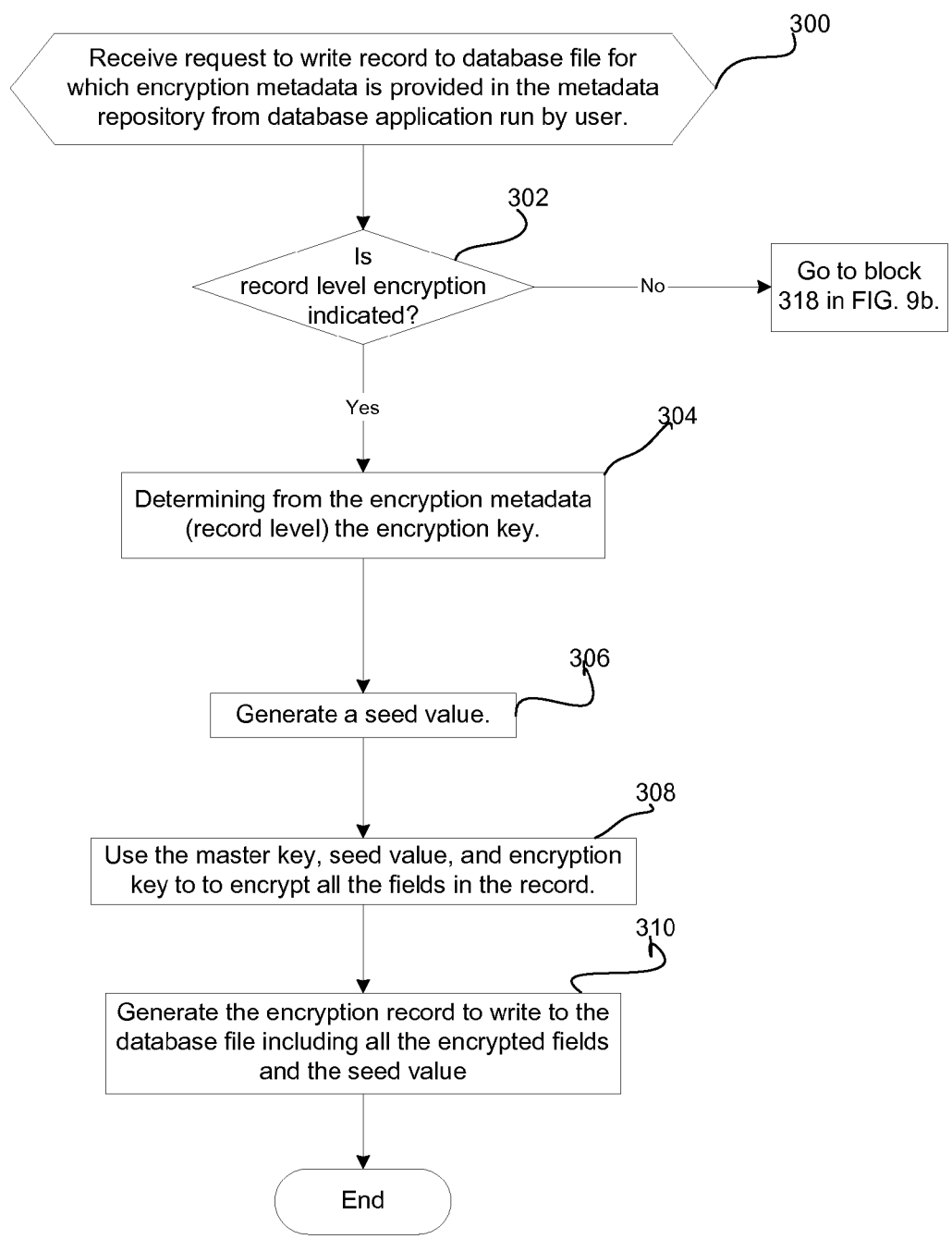

ENCRYPTING AND DECRYPTING DATABASE RECORDS

BACKGROUND OF THE INVENTION

1. Field

The present invention relates to a method, system, and article of manufacture for encrypting and decrypting database records.

2. Description of the Related Art

Businesses often maintain highly sensitive and confidential information on their business operations and customers in a database management system. Providing security for database information is a primary concern of information technology managers. In fact, government regulations require that certain sensitive data, such as credit card numbers, social security numbers, etc., be secured to protect from identity theft. Companies have lost substantial business and credibility as a result of data theft.

One security solution to these problems is to provide a hardware or software encryption solution. Such current encryption solutions require the installation of an add-on program or hardware device and the modification of the database applications to incorporate commands and interfaces to invoke the encryption and decryption services. This can be burdensome by requiring that database users both learn to use the commands and interfaces of the encryption services and then modify currently used database applications to include calls to the encryption services.

For these reasons, there is a need in the art for improved techniques to provide encryption services for database management systems.

SUMMARY

Provided are a method, system, and article of manufacture for encrypting and decrypting database records. Encryption metadata is provided for a database file having fields, wherein the encryption metadata indicates at least one encryption key for the file. A request is received to perform a read or write operation with respect to a record including the fields for the database file. A determination is made from the encryption metadata of the at least one encryption key for the database file. The determined encryption key is used to encrypt or decrypt for the read or write operation with respect to at least one of the fields in the database file.

BRIEF DESCRIPTION OF THE DRAWINGS

FIG. 2 illustrates an embodiment of a format of encryption metadata.

FIG. 3 illustrates an embodiment of a format of field encryption information for field level encryption.

FIG. 4 illustrates an embodiment of a format of record encryption information for record level encryption.

FIG. 5 illustrates an embodiment of a format of an encrypted record having record level encryption.

FIG. 6 illustrates an embodiment of a format of an encrypted record having field level encryption.

FIG. 7 illustrates an embodiment of a format of an entry in the key store for an encryption key.

FIG. 8 illustrates an embodiment of operations to provide an encryption management user interface to a user.

FIGS. 9a and 9b illustrate an embodiment of operations to perform encryption in response to a write request for a record.

DETAILED DESCRIPTION

Figure 1:
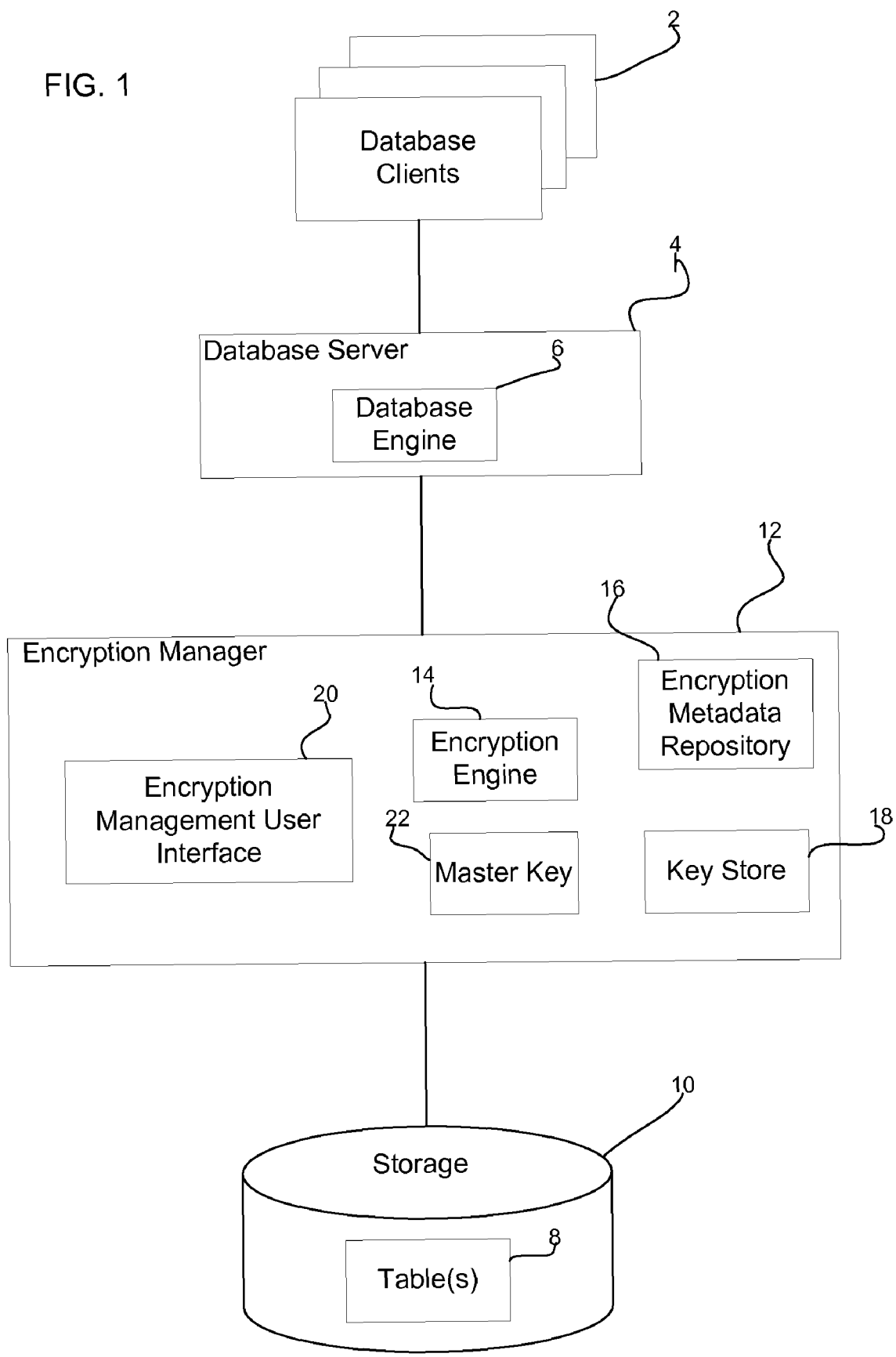
FIG. 1 illustrates an embodiment of a computing environment.

FIG. 1 illustrates a computing environment in which embodiments may be implemented. One or more database clients 2 may execute database applications that submit read/write requests to a database server 4, including a database engine 6, with respect to records stored in tables 8 in a storage 10 managed by the database engine 6. The tables 8 are defined to include one or more database fields or columns and have a plurality of records, where each record includes a unique identifier and provides values for the fields (i.e., columns) defined for the table 8. The database engine 6 submits read/write requests to an encryption manager 12 to handle encryption/decryption with respect to the database records subject to the request.

The encryption manager 12 includes an encryption engine 14 to perform encryption related operations, an encryption metadata repository 16 including encryption information for one or more database tables 8, a key store 18 storing indexable encryption keys, indexed according a key identifier, and an encryption manager user interface 20 to enable a user to define encryption techniques for the tables 8 by adding, deleting or modifying encryption information in the encryption metadata repository 16.

The encryption manager 12 further includes and maintains a master key 22 created when the encryption manager 12 was installed for use with the database server 4. The master key 22 is used to encrypt certain components, such as the metadata repository 16 and/or key store 18, and may be used in encryption and decryption operations. The use of the master key 22 for general operations ensures that if someone copies the metadata repository 16 and/or key store 18, then they cannot access that information without the master key 22. The use of the master key 22 for encryption and decryption provides further randomization to these processes.

The database clients 2 and database server 4 may be implemented on different computer systems and communicate over a network (e.g., Local Area Network (LAN), Storage Area Network (SAN), Wide Area Network (WAN), peer-to-peer network, wireless network, etc.), direct connection (serial, parallel, etc), bus interface (e.g., a Peripheral Component Interconnect (PCI) bus or serial interface) or be implemented on a same computer system, within the same or different runtime environments and communicate using internal system processes. The database applications 2 and database server 4 may communicate using database client-server architectures known in the art.

In one embodiment, the encryption manager 12 is maintained in a separate device/system from the database server 4, and may communicate with the database server 4 over a network, bus interface or direction connection. The encryption manager 12 may be implemented in code executed by a processor and/or implemented in a hardware device. In an alternative embodiment, the encryption manager 12 may comprise program components executing in the same computer system in which the database server 4 executes and communicate with the database server 4 using system calls. The encryption manager 12 may communication with the storage 10 over a network, bus interface or direct connection. Yet further, some or all of the encryption manager 12 may be implemented at the file system level of the operating system of the database server 4 or a server managing the storage 10 (not shown), such as in the kernel operating space.

The encryption manager 12 components may be implemented in hardware, software or a combination thereof. In one embodiment the key store 18 may be maintained in a separate device from the encryption manager 12 or maintained within the encryption manager 12 (as shown in FIG. 1).

The database clients 2 may execute database applications including database access commands written in a database language, such as the Structured Query Language (SQL), and include database client code to communicate with the database server 4. The database client 2 and server 4 code may be implemented using database systems known in the art. The storage 10 may comprise storage devices known in the art, such as interconnected hard disk drives (e.g., configured as a DASD, RAID, JBOD, virtualized devices, etc.), magnetic tape, electronic memory, flash memory, optical disk, etc.

In the described embodiments, the encryption manager 12 provides a layer of encryption/decryption processing between the database server 4 and the storage 10 to handle encryption services in a transparent manner with respect to the database server 4 and database applications 2.

FIG. 2 illustrates an embodiment of a format of encryption metadata 50 maintained in the encryption metadata repository 12 for a table 8 managed by the database engine 6, where a separate instance of the encryption metadata 50 may be maintained in the metadata repository 12 for each table for which encryption/decryption is provided. The encryption metadata 50 indicates the database file 52, e.g., table 8, to which the encryption metadata applies; an encryption level flag 54 indicating whether encryption is performed at the record level for all fields in the record or at a field level, where encryption is performed on a field-by-field basis; and field encryption information 56 providing the specific encryption information for the record as a whole or fields in the record.

FIG. 3 illustrates an embodiment of the field encryption information 60 for each field in the record subject to encryption when encryption is performed at the field level. The field encryption information 60 includes a field identifier 62 of the field in the database table for which encryption is provided; an encryption key identifier (ID) 64 of an encryption key used to encrypt/decrypt with respect to the field, where the key ID may be used to access the encryption key from the key store 18; an encryption algorithm 66 to use for encryption (such that different fields may be encrypted using different available encryption algorithms known in the art); and a decryption disabled flag 68 indicating whether the field is not to be decrypted when returning the record in response to a read request.

FIG. 4 illustrates an embodiment of the field encryption information 80 when encryption is performed at the record level. The field encryption information 80 includes an encryption key identifier (ID) 82 of an encryption key used to encrypt/decrypt with respect to all fields in the record; and an encryption algorithm 84 to use for encrypting the fields in the record.

FIG. 5 illustrates an embodiment of the format of an encrypted record 90 encrypted at the record level and stored in the table 8 in the storage 10, including a record identifier 92 providing a unique identifier (ID) of the record in the database table 8; a seed value 94 providing a pseudo-random value provided as input along with the encryption key to the encryption engine 14 to use to encrypt the record; and the encrypted fields 96 of the record encrypted by the encryption engine 14 using the seed value 94 and the encryption key indicated in the key ID 82 (FIG. 4). In one embodiment, the seed value may comprise a seed generated by a seed generation process. Alternatively, the seed value may be generated from a system clock or counter value that is incremented each time encryption is to be performed or may be generated using other suitable pseudo-random generation techniques known in the art to provide a random element to the encryption engine 14 to randomize the encrypted data.

FIG. 6 illustrates an embodiment of the format of an encrypted record 100 encrypted at the field level and stored in the table 8 in the storage 10, including a record identifier 102 providing unique ID of the record in the database table 8; a seed value 104 providing a pseudo-random value provided to the encryption engine 14 to use to encrypt one or more fields in the record; encrypted fields 108a . . . 108n; for each encrypted field a signature 106a . . . 106n generated from the corresponding encrypted field 108a . . . 108n; and the unencrypted fields 110 for which encryption is not provided. The generated signature may be unique for the field and generated using signature or digest generation techniques known in the art, such as the digest algorithm SHA1. The generated signature may be generated using the master key 22 to further protect the signature.

In one embodiment, the seed value 104 and signature values 106a . . . 106n are stored with the record in the table 8 in the storage 10. In an alternative embodiment, the seed values 94, 104 and/or signatures 106a . . . 106n may be stored separately from the records in the tables 8.

FIG. 7 illustrates an embodiment of a key entry 110 included in the key store 18 for each created encryption key, including a key identifier (ID) 112 or index providing an identifier used to access the key that may be included in fields 64 and 82 (FIGS. 3 and 4) of the field encryption information 60 and 80; the actual encryption key 114; a password 116 that must be presented by the user before the encryption key 114 may be used; and authorized users 118 identifying one or more users or groups of users authorized to access the encryption key to encrypt and/or decrypt with respect to the particular identified field. Users may be authorized at the operating system level or database management system level. The stored password 116 may comprise a hash value formed using the password 116, the key ID 112, and the master key 22.

The encryption management user interface 20 provides commands for a command line interface and/or a graphical user interface (GUI) enabling a user to create, modify and delete encryption metadata 50 for a table 8 in the encryption metadata repository 16 and create, modify or edit encryption keys in the key store 18. In one embodiment, a master key 22 is generated when installing the encryption manager 12 for use with a database engine and the associated tables 8, i.e., during product installation of the encryption manager 12. This master key 22 may be used to encrypt the key store 18 and the encryption metadata repository 16, so that only the user presenting the master key 22 may access and modify the key store 18 and encryption metadata repository 16 in order to prevent unauthorized access. Although only the user presenting the master key 22 may modify encryption metadata 50, users indicated as authorized users 118 may access the encryption key using the encryption key ID 64, 82 (FIGS. 3 and 4) from the key store 18 to use for encryption/decryption operations.

Both the key store 18 and the metadata repository 16 may further be encrypted with a unique system identifier (ID) of the system including the database server 4 or the encryption manager 12 to prevent the unauthorized copying of the key store 18 and metadata repository 16 into another system.

FIG. 8 illustrates an embodiment of operations performed by the encryption management user interface 20 to enable the user to create, modify and delete encryption metadata 50 in the encryption metadata repository 16. Control begins at block 200 in response to a user initiating an operation to manage encryption metadata 50 and the key store 18 in the metadata repository 16, where the user must present the master key 22 to decrypt the encryption metadata repository 16 and key store 18. The encryption management user interface 20 may provide command line commands and/or a GUI to enable the user to manage encryption metadata 50. The encryption management user interface 20 enables (at block 202) the user to create, delete and modify encryption key entries 110 (FIG. 7) for encryption keys in the key store 18. The user may enter or modify a password 116, along with information for the other fields, such as the encryption key 114 and authorized users 118 for the encryption key. If the user does not provide a password, then a system password or no password may be used. When creating the key, the encryption engine 14 may hash or encrypt the password 116.

The encryption management user interface 20 enables (at block 204) the user to create, delete and modify encryption metadata 50 for a table 8. The encryption management user interface 20 enables (at block 206) the user to specify an encryption key 82 (FIG. 4) for a database file (record level) or separate encryption key 64 (FIG. 3) for one or more fields defined for a table 8 (field level), and specify encryption algorithm(s) 64, 84 to use for all the fields in the table 8 (record level) or each field (field level). The encryption management user interface 20 further enables the user to modify (at block 208) other information in the encryption metadata 50 in the encryption metadata repository 16, such as setting the decryption disabled flag 68 for each field (at block 210), etc.

Before performing encryption or decryption, the encryption manager 12 must activate the encryption keys in the key store 18 for the user requesting the access to the table 8. The database engine 6 may initiate the request in response to a request from a database client 2 executing an SQL command to write to one or more fields of a record for the table 8. The encryption manager 12 must authenticate whether the user of the database client 2 initiating the request is authorized to access the encryption keys.

To activate keys, the encryption manager 12 determines the identifiers of all encryption keys 64, 82 needed to access the fields or records in a table 8 and then verifies whether the user initiating the request presents the correct passwords 116 for the determined encryption keys, i.e., the hash of the presented password matches the hashed password 116 stored with the encryption key 114, and that the requesting user is indicated as an authorized user 118 for the requested encryption keys. If the user is authorized, i.e., presents the correct password 16 and is indicated as an authorized user 118, then the encryption key that the user is authorized to access is stored in the local memory for the encryption engine 14, along with the Key ID 64, 82 and any seed value used with the encryption key for access by the encryption engine 14. In one embodiment, if the user cannot be authenticated with respect to all keys needed to perform the encryption/decryption operations, i.e., by presenting the correct password 116 and being identified as an authorized user 118, then any encryption/decryption operations requested for such user will fail and only encrypted data will be returned. In an alternative embodiment, only those fields for which the user has authorized keys are decrypted and fields for which the user does not have authorized keys remain encrypted. The decrypted fields and encrypted fields are returned.

Figure 9B:
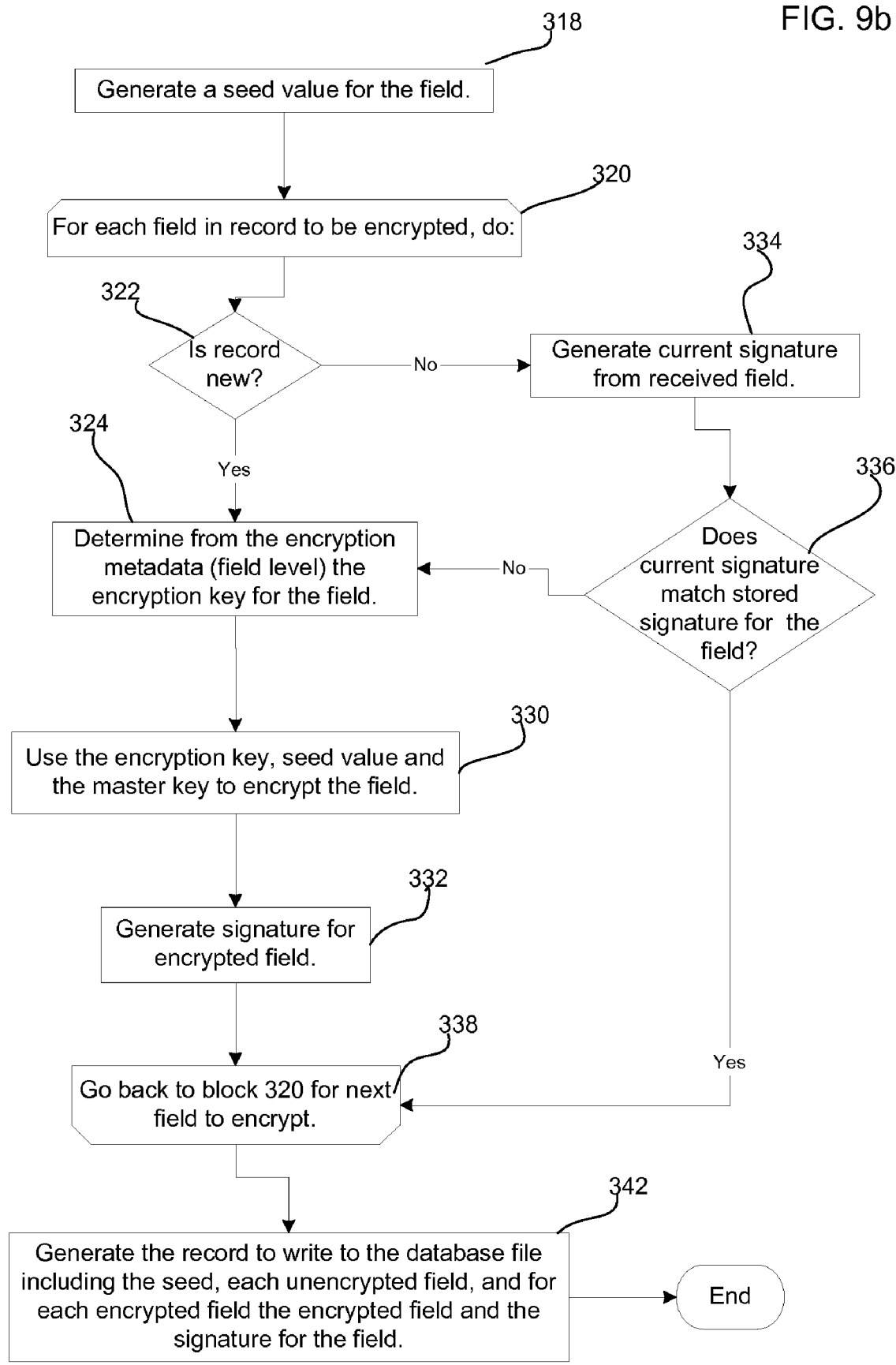

FIGS. 9a and 9b illustrate an embodiment of operations performed by the encryption engine 14 to perform encryption with respect to a request from the database engine 6 to write to one or more fields in a record for one table 8, i.e., database file. Operations are initiated when the encryption engine 14 receives (at block 300) from the database engine 6 a request to write to one or more fields of one record of a table 8 (database file) for which encryption metadata 50 (FIG. 2) is provided in the metadata repository 16. If (at block 302) the encryption level flag 54 of the encryption metadata 50 for the table 8 to modify indicates record level encryption, then the encryption engine 14 determines (at block 304) from the record level field encryption information 80 (FIG. 4) of the encryption metadata 50 for the table 8 the record level encryption key 82. The encryption engine 14 then generates (at block 306) a seed value 94 (FIG. 5). The encryption engine 14 uses (at block 308) the seed value 94, the encryption key, and the master key 22 to encrypt all the fields in the record to write using the identified encryption algorithm 84 or a default algorithm. The encryption engine 14 then generates (at block 310) the encryption record 90 (FIG. 5) to write to the table 8 (database file) in the storage 10 including the seed value 94 used to encrypt the fields 96.

If (at block 302) encryption level flag 54 indicates field level encryption, then control proceeds to block 318 in FIG. 9b. At block 318, a seed value is generated to use to encrypt each field for which encryption is to be provided. The seed value may be generated as discussed above. In one embodiment, one seed value may be used to encrypt all the fields subject to encryption. In an alternative embodiment, a separate seed value may be generated for each field to be encrypted, where the different seed values generated for different encryption fields would be stored with the encrypted record. For field level encryption, the encryption engine 14 performs a loop of operations at blocks 320 through 338 for each field indicated to be encrypted in the encryption metadata 50 for the record to write. If (at block 322) the fields are being written to a new record to add to the table 8, then the encryption engine 14 determines (at block 324) from the field encryption information 60 (FIG. 3) the encryption key ID 64 for the field. The determined encryption key may be accessed from the encryption engine 14 local memory using the determined encryption key ID 64. The encryption engine 14 uses (at block 330) the encryption key, seed value 104, and master key 22 to encrypt the field using the algorithm 66. The encryption engine 14 may use additional or different information to perform the encryption, such as a system ID. The encryption engine 14 generates (at block 332) a signature 106a . . . 106n for the field.

If (at block 322) the record being written is not new, i.e., already exists in the table 8, then the encryption engine 14 generates (at block 334) a current signature for the field subject to encryption using the signature generation technique used at block 332. If (at block 336) the current signature matches the stored signature 106a . . . 106n for the field, then the field in the record to write is still encrypted and is not changed by the write request. For instance, if the user that is performing the write was not authorized to decrypt the field or the decryption disabled flag 68 was set for the field, then the user would have received the encrypted field and the write request would not access and change the encrypted field. In such case, this unchanged encrypted field does not need to be encrypted again and control proceeds to block 338 to consider the next field that is to be encrypted. If the signatures do not match (at block 336), then the field was unencrypted when presented to the application performing the write. In such case, control proceeds to block 324 to encrypt this field, which contains unencrypted data.

After performing encryption to the fields of the record subject to the write request, the encryption engine 14 generates (at block 342) the record 100 (FIG. 6) to write to the table 8 (database file) including the seed value 104, each unencrypted field 110 and for each encrypted field 108a . . . 108n the signature 106a . . . 106n for the encrypted field 108a . . . 108n generated for the write request or generated for a previous write request if the encrypted field was provided to the user that initiated the write request.

With the described operations of FIGS. 9a and 9b, encryption may be performed with respect to all the fields in a record to be written to a table 8 or certain specified fields of the record, which different fields may be encrypted with the same or different encryption keys as specified in the encryption metadata 50 for the record. Further, signatures may be used to avoid performing encryption with respect to fields in the record to write that have unchanged encrypted data to improve performance by avoiding unnecessary encryption operations.

Figure 10A:
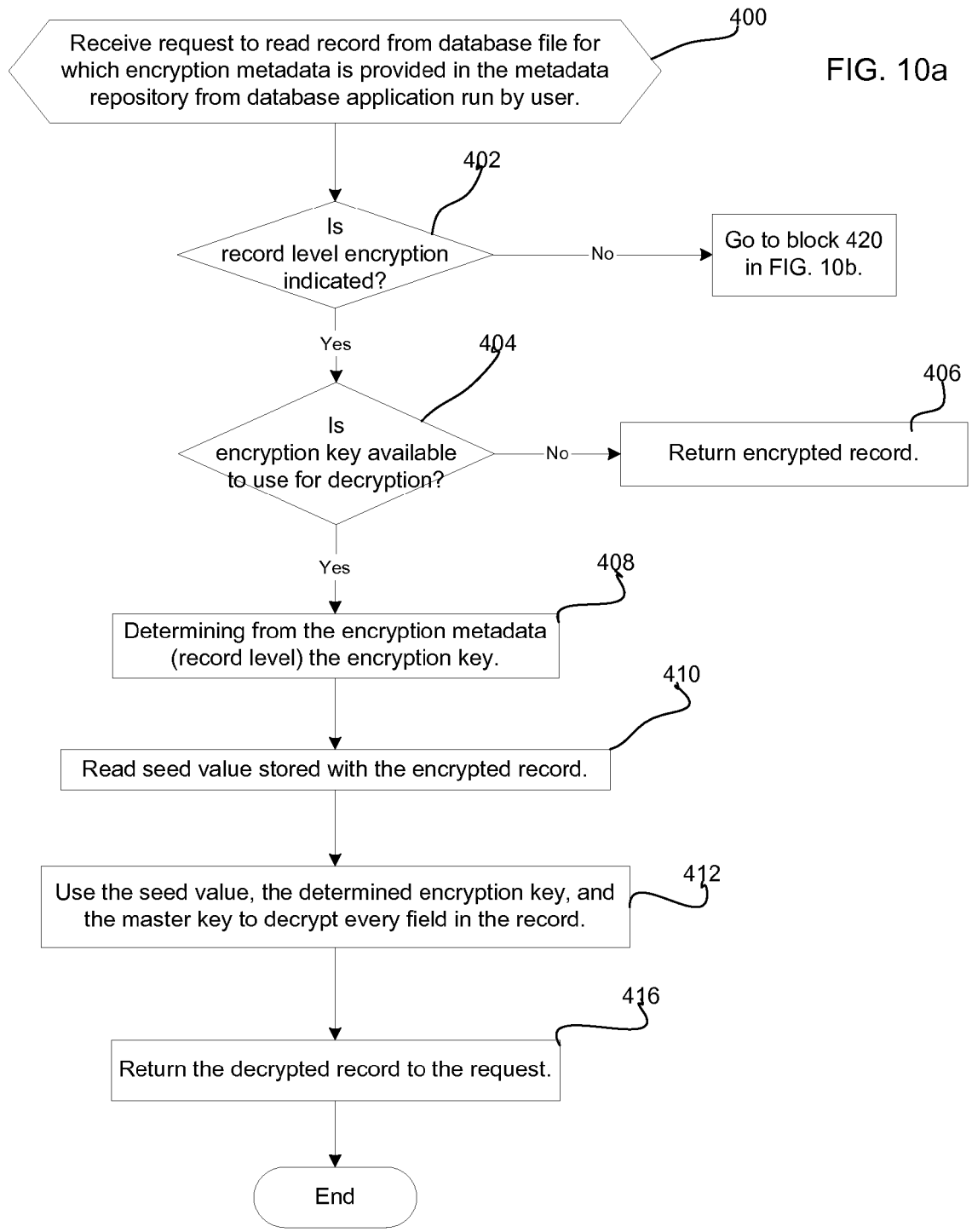
FIGS. 10a and 10b illustrate an embodiment of operations to perform encryption in response to a read request for a record.
Figure 10B:
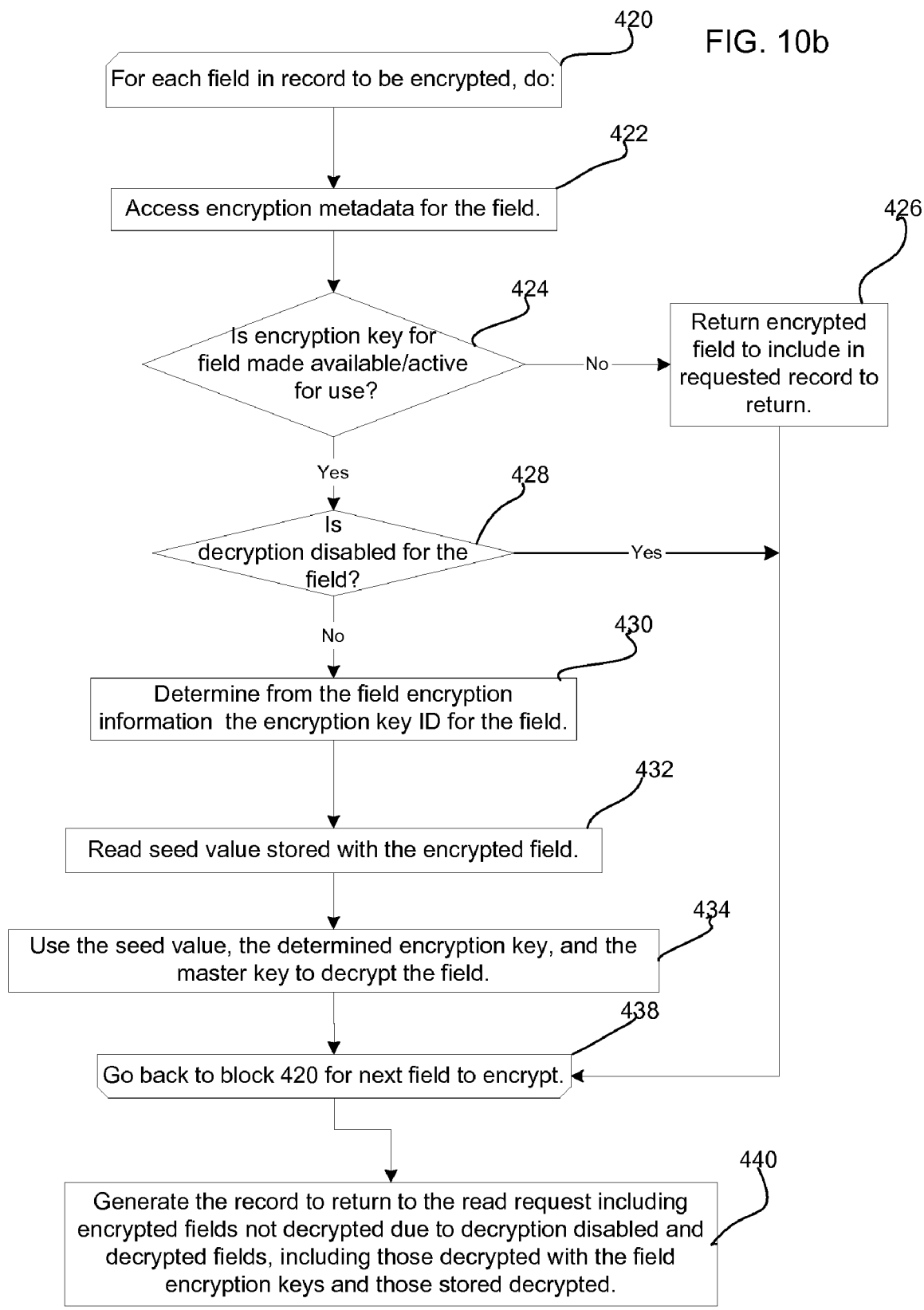

FIGS. 10a and 10b illustrate an embodiment of operations performed by the encryption engine 14 to decrypt a requested record in response to a request from the database engine 6 for a record requested by the database client 2 executing a database (e.g., SQL) application. In response to receiving (at block 400) request to read a record from a table 8 (database file) for which encryption metadata 50 is provided in the metadata repository 16, initiated from a database application run by a user, a determination is made (at block 402) as to whether the encryption level flag 54 indicates record or field level encryption. If record level encryption is indicated, then a determination is made (at block 404) as to whether the encryption key available to use for decryption for the user. As discussed, all required keys are provided to the encryption engine 14 to use if the user initiating the request presents the correct password 116 and is indicated as authorized 118. If the record level encryption key 82 is not available, then the encryption engine 14 returns (at block 406) the encrypted record 90 to return. Alternatively, if the user is not authorized, then the read request may fail.

If (at block 404) the required encryption key is available, then the encryption engine 14 determines (at block 408) the encryption key from the encryption information 80 for the encryption key, which may be accessed from a local buffer for the encryption engine 14 using the encryption key ID 82. The encryption engine 14 reads (at block 410) the seed value 94 from the requested encrypted record 90 (FIG. 5). The encryption engine 14 uses (at block 412) the seed value 94, the determined encryption key, and other information, such as the master key 22 to decrypt every field in the record using the indicated encryption algorithm 84 (FIG. 4). In one embodiment, the encryption engine 14 may use the seed value 94 and the determined encryption key to decrypt the fields. Alternatively, the encryption engine may use the master key 22 or other information to decrypt the data, such as a system identifier. The decrypted record is returned (at block 416) to the database engine 6. The method to decrypt the record must correspond to that used when encryption is performed.

If (at block 402) the encryption level flag 54 indicates field level encryption for the requested record, then control proceeds to block 420 in FIG. 10b where the encryption engine 14 performs a loop of operations at blocks 420 through 438 to attempt decryption with respect to encrypted fields 108a . . . 108n in the encrypted record 100 (FIG. 6), encrypted at the field level. For fields subject to encryption, the encryption engine 14 accesses (at block 422) the field encryption information 60 (FIG. 3) for the field and determines (at block 424) whether the encryption key identified for the field is available, i.e., whether the key was activated. If the key is not available or active, then the encryption engine 14 returns (at block 426) the encrypted field to include in the record (or fields) to return to the read request and proceeds to block 438 to consider a next encrypted field. If (at block 424) the required encryption key is available, but decryption is disabled for the field (at block 428), as indicated in the decryption disabled flag 68 for the field being considered, then control proceeds to block 438 to consider the next encrypted field 108b . . . 108n to return to the request.

If (at block 428) decryption is not disabled for the encrypted field 108a . . . 108n, then the encryption engine 14 determines (at block 430) from the field encryption information 60 the encryption key ID 64 for the field. The encryption engine 14 reads (at block 432) the seed value 104 for the encryption record 100 (FIG. 6) and uses (at block 434) the seed value 104, encryption key, and optionally the master key 22 and/or other information to decrypt the field using the algorithm 66 identified for the field.

After processing all fields, which may involve decrypting any number of the encrypted fields 108a . . . 108n, the encryption engine 14 generates (at block 440) the record to return to the read request including encrypted fields not decrypted due to decryption disabled 68 (FIG. 3) or lack of user authorization/password and decrypted fields, including those decrypted with the field encryption keys and those stored decrypted 110.

In the described operations of FIGS. 10b and 10b, the encryption engine 14 attempted encryption and decryption with respect to all fields in the record. In embodiments where the database engine 6 submits a write or read request with respect to less than all the fields in an encrypted record having field level encryption, then the encryption engine 14 may perform the read, write, and encryption/decryption with respect to only the requested fields and return or write to only the requested fields instead of returning or writing to all fields.

In the described embodiments, encryption and decryption was performed with respect to read and write requests to a database file for which encryption metadata is provided. In an additional embodiment, after the user defines encryption metadata for an existing table having existing records, the encryption engine 14 may then process the records of the table 8 and encrypt the records already in the table 8 using the record or field level encryption operations described with respect to FIGS. 9a and 9b.

With the described embodiments, a user may specify encryption at a record or field level to apply to the records of a table. An encryption layer between the database engine and storage may then intercept database engine requests to the table and handle encryption and decryption for write and read requests in a manner that is transparent to the database engine 14 and database client 2. With the described embodiments, encryption may be deployed in a database environment without requiring modification of database applications or the database engine.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the encryption manager performed encryption with respect to records in a database file. In an alternative embodiment, the encryption manager may perform encryption related operations of data in different data structures, such as to files in a file system, fields in a structured document, such as an Extensible Markup Language (XML) document, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Further, when a reference letter, such as "a", "b", or "n" is used to denote a certain number of items, the reference "a", "b" or "n" used with different elements may indicate the same or different number of such elements.

Figure 11:
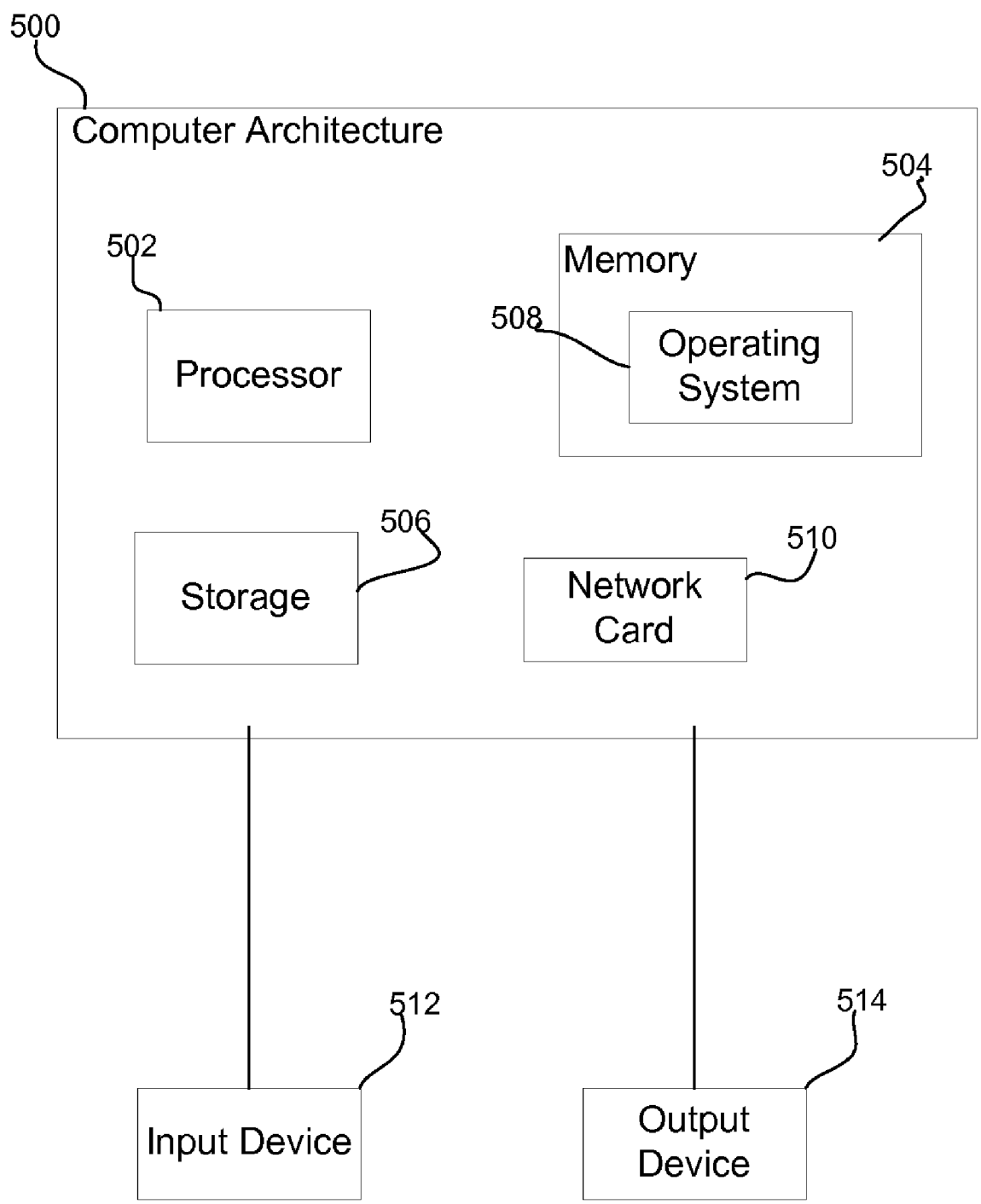
FIG. 11 illustrates a computer architecture in which aspects of the invention may be implemented.

FIG. 11 illustrates an embodiment of a computer architecture 500 that may be implemented by the database clients 2, database server 4, and encryption manager 12. The architecture 500 may include a processor 502 (e.g., a microprocessor), a memory 504 (e.g., a volatile memory device), and storage 506 (e.g., a non-volatile storage, such as magnetic disk drives, electronic memory devices, e.g., Flash Memory, optical disk drives, a tape drive, etc.). The storage 506 may comprise an internal storage device or an attached or network accessible storage. Programs, including an operating system 508 and application programs, in the storage 506 are loaded into the memory 504 and executed by the processor 502 in a manner known in the art. The architecture further includes a network card 510 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information transmitted from the processor 502, or other component, such as a display monitor, printer, storage, etc.

FIGS. 2, 3, 4, 5, 6, and 7 show information maintained in a certain format. In alternative embodiments, the information shown in these figures may be maintained in alternative data structures and formats, and in different combinations.

The illustrated operations of FIGS. 8, 9a, 9b, 10a, and 10b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
providing encryption metadata for a database file in a computer readable storage device having fields, wherein the encryption metadata indicates at least one of:
record level encryption information indicating a record level encryption key to use for all fields in records in the database file; and
for each of a plurality of fields in the database file, field level encryption information indicating a field level encryption key and a field identifier identifying the field to which the field level encryption key applies;
receiving a request to perform a read or write operation with respect to a record including the fields for the database file;
determining from the encryption metadata whether record level or field level encryption is indicated;
in response to determining that the encryption metadata indicates record level encryption, performing:
determining from the record level encryption information in the encryption metadata the record level encryption key to use with respect to all fields; and
using the determined record level encryption key to encrypt or decrypt for the read or write operation with respect to the fields in the database file; and
in response to determining that the encryption metadata indicates field level encryption and not record level encryption, performing:
for each field in the record, determining whether there is field level encryption information in the encryption metadata for the field having the field level encryption key to use with respect to the field; and
using the determined field level encryption key for each field for which the field level encryption key is provided to encrypt or decrypt for the read or write operation with respect to the field.

2. The method of claim 1, wherein using the determined field level or record level encryption key to encrypt comprises:
generating a seed value;
using the field level or record level encryption key and the seed value to encrypt data in the record; and
storing the encrypted record and the seed value used to encrypt the record, wherein the stored seed value and the field level or record level encryption key are used to decrypt the encrypted data in the record.

3. The method of claim 2, wherein the encryption metadata indicates one field level encryption key for each of a plurality of fields in the record for which encryption is to be performed, wherein the field level encryption key and the seed value are used to perform encryption and decryption with respect to the field in the record.

4. The method of claim 1, wherein the encryption metadata indicates one field level encryption key for each of a plurality of fields in the record for which encryption is to be performed, wherein at least two of the fields have different field level encryption keys, and wherein the operation of using the determined field level encryption key is performed for each field for which one field level encryption key is provided using the field level encryption key provided for the field.

5. The method of claim 1, wherein the encryption metadata indicates one field level encryption key for each of a plurality of fields in the record for which encryption is to be performed, wherein the encryption metadata indicates decryption disabled for at least one field in the record for which encryption is indicated to be performed, wherein the determined field level encryption key is used to decrypt data for each field for which encryption disabled is not indicated, further comprising:
returning to the request encrypted data for each field for which decryption disabled is indicated.

6. The method of claim 5, further comprising:
generating a signature for each encrypted field to write to the database file;
storing the signature for each encrypted field when storing the record including the encrypted field that is written to the database file;
receiving a request to write a modified record to the database file; and
for each field in the modified record for which encryption is to be performed, further performing:
generating a current signature for the field in the write request;
writing the field to the record in the database file without encrypting the field in response to determining that the signature stored for the field matches the current signature; and
encrypting the field in the modified record before writing the field to the record in the database file in response to determining that the signature stored for the field does not match the field in the modified record.

7. The method of claim 1, further comprising:
generating a master key; and
using the master key with the field level or record level encryption key to encrypt the record.

8. The method of claim 7, further comprising:
indicating at least one user authorized to use the field level or record level encryption key, wherein the operations of using the determined field level or record level encryption key is only performed in response to determining that the request originates from one user authorized to use the field level or record level encryption key.

9. The method of claim 7, further comprising:
providing one password for the at least one field level or record level encryption key, wherein the operations of using the determined field level or record level encryption key is only performed in response to receiving the password with the request; and
storing a hash of the password with the field level or record level encryption key, wherein the password is hashed using the master key.

10. The method of claim 7, wherein using the determined at least one field level or record level encryption key to encrypt comprises:
generating a seed value;
encrypting data in the record using one of the field level or record level encryption keys, the seed value, and the master key; and
storing the encrypted record and the seed value used to encrypt the data, wherein the stored seed value, the field level or record level encryption key, and master key are used to decrypt the encrypted data in the record.

11. The method of claim 1, wherein the encryption metadata indicates one field level encryption key for each of a plurality of fields in the record for which encryption is to be performed and one of a plurality of available encryption algorithms, wherein the encryption metadata is configured to indicate different field level encryption keys and/or encryption algorithms for different fields for which encryption is to be provided.

12. A system, comprising:
at least one computer readable storage device including an encryption metadata repository including encryption metadata for a database file having fields, wherein the encryption metadata indicates at least one of:
record level encryption information indicating a record level encryption key to use for all fields in records in the database file; and
for each of a plurality of fields in the database file, field level encryption information indicating a field level encryption key and a field identifier identifying the field to which the field level encryption key applies; and
at least one of a hardware device or the at least one computer readable storage device including instructions executed by a processor having an encryption manager executed to perform operations, the operations comprising:
receiving a request to perform a read or write operation with respect to a record including the fields for the database file;
determining from the encryption metadata whether record level or field level encryption is indicated;
in response to determining that the encryption metadata indicates record level encryption, performing:
determining from the record level encryption information in the encryption metadata the record level encryption key to use with respect to all fields; and
using the determined record level encryption key to encrypt or decrypt for the read or write operation with respect to the fields in the database file; and
in response to determining that the encryption metadata indicates field level encryption and not record level encryption, performing:
for each field in the record, determining whether there is field level encryption information in the encryption metadata for the field having the field level encryption key to use with respect to the field; and
using the determined field level encryption key for each field for which the field level encryption key is provided to encrypt or decrypt for the read or write operation with respect to the field.

13. The system of claim 12, wherein using the determined field level or record level encryption key to encrypt comprises:
generating a seed value;
using the field level or record level encryption key and the seed value to encrypt data in the record; and
storing the encrypted record and the seed value used to encrypt the record, wherein the stored seed value and the field level or record level encryption key are used to decrypt the encrypted data in the record.

14. The system of claim 13, wherein the encryption metadata indicates one field level encryption key for each of a plurality of fields in the record for which encryption is to be performed, wherein the field level encryption key and the seed value are used to perform encryption and decryption with respect to the field in the record.

15. The system of claim 12, wherein the encryption metadata indicates one field level encryption key for each of a plurality of fields in the record for which encryption is to be performed, wherein at least two of the fields have different field level encryption keys, and wherein the operation of using the determined field level encryption key is performed for each field for which one field level encryption key is provided using the field level field level encryption key provided for the field.

16. The system of claim 12, wherein the encryption metadata indicates one field level encryption key for each of a plurality of fields in the record for which encryption is to be performed, wherein the encryption metadata indicates decryption disabled for at least one field in the record for which encryption is indicated to be performed, wherein the determined field level encryption key is used to decrypt data for each field for which encryption disabled is not indicated, and wherein the encryption manager is further enabled to perform operations comprising:
returning to the request encrypted data for each field for which decryption disabled is indicated.

17. The system of claim 16, wherein the encryption manager is further enabled to perform operations comprising:
generating a signature for each encrypted field to write to the database file;
storing the signature for each encrypted field when storing the record including the encrypted field that is written to the database file;
receiving a request to write a modified record to the database file; and
for each field in the modified record for which encryption is to be performed, further performing:
generating a current signature for the field in the write request;
writing the field to the record in the database file without encrypting the field in response to determining that the signature stored for the field matches the current signature; and
encrypting the field in the modified record before writing the field to the record in the database file in response to determining that the signature stored for the field does not match the field in the modified record.

18. The system of claim 12, wherein the encryption manager is further enabled to perform operations comprising:
generating a master key; and
using the master key with the field level or record level encryption key to encrypt the record.

19. The system of claim 18, further comprising:
an user interface enabled to receive user input indicating at least one user authorized to use the field level or record level encryption key, wherein the operations of using the determined field level or record level encryption key are only performed in response to determining that the request originates from one user authorized to use the field level or record level encryption key.

20. The system of claim 19, wherein the user interface is further enabled to perform:
receiving user input of one password for the at least one field level or record level encryption key, wherein the operations of using the determined field level or record level encryption key is only performed in response to receiving the password with the request; and
storing a hash of the password with the field level or record level encryption key, wherein the password is hashed using the master key.

21. The system of claim 18, wherein using the determined at least one field level or record level encryption key to encrypt comprises:
generating a seed value;
encrypting data in the record using one of the field level or record level encryption keys, the seed value, and the master key; and
storing the encrypted record and the seed value used to encrypt the data, wherein the stored seed value, the field level or record level encryption key, and master key are used to decrypt the encrypted data in the record.

22. The system of claim 12, wherein the encryption metadata indicates one encryption key for each of a plurality of fields in the record for which encryption is to be performed and one of a plurality of available encryption algorithms, wherein the encryption metadata is configured to indicate different field level encryption keys and/or encryption algorithms for different fields for which encryption is to be provided.

23. An article of manufacture comprising a computer readable storage device having code executed to access a database file and cause operations to be performed, the operations comprising:
    providing encryption metadata for the database file having fields, wherein the encryption metadata indicates at least one of:
        record level encryption information indicating a record level encryption key to use for all fields in records in the database file; and
        for each of a plurality of fields in the database file, field level encryption information indicating a field level encryption key and a field identifier identifying the field to which the field level encryption key applies;
    receiving a request to perform a read or write operation with respect to a record including the fields for the database file;
    determining from the encryption metadata whether record level or field level encryption is indicated;
    in response to determining that the encryption metadata indicates record level encryption, performing:
        determining from the record level encryption information in the encryption metadata the record level encryption key to use with respect to all fields; and
        using the determined record level encryption key to encrypt or decrypt for the read or write operation with respect to the fields in the database file; and
    in response to determining that the encryption metadata indicates field level encryption and not record level encryption, performing:
        for each field in the record, determining whether there is field level encryption information in the encryption metadata for the field having the field level encryption key to use with respect to the field; and
        using the determined field level encryption key for each field for which the field level encryption key is provided to encrypt or decrypt for the read or write operation with respect to the field.

24. The article of manufacture of claim 23, wherein using the determined field level or record level encryption key to encrypt comprises:
    generating a seed value;
    using the field level or record level encryption key and the seed value to encrypt data in the record; and
    storing the encrypted record and the seed value used to encrypt the record, wherein the stored seed value and the field level or record level encryption key are used to decrypt the encrypted data in the record.

25. The article of manufacture of claim 24, wherein the encryption metadata indicates one field level or record level encryption key for each of a plurality of fields in the record for which encryption is to be performed, wherein the field level or record level encryption key and the seed value are used to perform encryption and decryption with respect to the field in the record.

26. The article of manufacture of claim 23, wherein the encryption metadata indicates one field level encryption key for each of a plurality of fields in the record for which encryption is to be performed, wherein at least two of the fields have different field level encryption keys, and wherein the operation of using the determined field level encryption key is performed for each field for which one field level encryption key is provided using the field level encryption key provided for the field.

27. The article of manufacture of claim 23, wherein the encryption metadata indicates one field level encryption key for each of a plurality of fields in the record for which encryption is to be performed, wherein the encryption metadata indicates decryption disabled for at least one field in the record for which encryption is indicated to be performed, wherein the determined field level encryption key is used to decrypt data for each field for which encryption disabled is not indicated, wherein the operations further comprise:
    returning to the request encrypted data for each field for which decryption disabled is indicated.

28. The article of manufacture of claim 27, wherein the operations further comprise:
    generating a signature for each encrypted field to write to the database file;
    storing the signature for each encrypted field when storing the record including the encrypted field that is written to the database file;
    receiving a request to write a modified record to the database file; and
    for each field in the modified record for which encryption is to be performed, further performing:
        generating a current signature for the field in the write request;
        writing the field to the record in the database file without encrypting the field in response to determining that the signature stored for the field matches the current signature; and
        encrypting the field in the modified record before writing the field to the record in the database file in response to determining that the signature stored for the field does not match the field in the modified record.

29. The article of manufacture of claim 23, wherein the operations further comprise:
    generating a master key; and
    using the master key with the field level or record level encryption key to encrypt the record.

30. The article of manufacture of claim 29, wherein the operations further comprise:
    indicating at least one user authorized to use the field level or record level encryption key, wherein the operations of using the determined field level or record level encryption key is only performed in response to determining that the request originates from one user authorized to use the field level or record level encryption key.

31. The article of manufacture of claim 29, wherein the operations further comprise:
    providing one password for the at least one field level or record level encryption key, wherein the operations of using the determined field level or record level encryption key is only performed in response to receiving the password with the request; and
    storing a hash of the password with the field level or record level encryption key, wherein the password is hashed using the master key.

32. The article of manufacture of claim 29, wherein using the determined at least one encryption key to encrypt comprises:

generating a seed value;

encrypting data in the record using one of the field level or record level encryption keys, the seed value, and the master key; and storing the encrypted record and the seed value used to encrypt the data, wherein the stored seed value, the field level or record level encryption key, and master key are used to decrypt the encrypted data in the record.

33. The article of manufacture of claim 23, wherein the encryption metadata indicates one field level encryption key for each of a plurality of fields in the record for which encryption is to be performed and one of a plurality of available encryption algorithms, wherein the encryption metadata is configured to indicate different field level encryption keys and/or encryption algorithms for different fields for which encryption is to be provided.

34. The method of claim 1, further comprising:

returning encrypted data in the field in the record for each field for which the field level encryption key is not provided.

35. The system of claim 12, wherein the operations further comprise:

returning encrypted data in the field in the record for each field for which the field level encryption key is not provided.

36. The article of manufacture of claim 23, wherein the operations further comprise:

returning encrypted data in the field in the record for each field for which the field level encryption key is not provided.

* * * * *